US006296317B1

(12) United States Patent
Ollis et al.

(10) Patent No.: US 6,296,317 B1
(45) Date of Patent: Oct. 2, 2001

(54) VISION-BASED MOTION SENSOR FOR MINING MACHINE CONTROL

(75) Inventors: Mark Ollis; Christopher C. Fromme; Timothy Ennis Hegadorn, all of Pittsburgh; Alonzo James Kelly, Sewickley; John Bares, Wexford; Herman Herman, Pittsburgh; Anthony J. Stentz, Pittsburgh; Richard McCargo Moore, Jr., Pittsburgh; David K. Herdle, Cranberry Township; Frank Higgins, Cranberry Township; Bryan G. Campbell, Cranberry Township., all of PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/430,102

(22) Filed: Oct. 29, 1999

(51) Int. Cl.[7] .................................................. E21C 35/08
(52) U.S. Cl. ......................... 299/1.4; 299/1.05; 299/30; 701/28; 382/104; 382/106; 382/153
(58) Field of Search ..................................... 299/1.05, 1.4, 299/1.9, 30; 701/23, 28, 25, 24, 20; 382/153, 104, 106; 356/3.07

(56) References Cited

U.S. PATENT DOCUMENTS

| | | | |
|---|---|---|---|
| 4,281,876 | * | 8/1981 | Lansberry ............................ 299/1.05 |
| 5,015,868 | * | 5/1991 | Park ..................................... 250/561 |
| 5,051,906 | * | 9/1991 | Evans, Jr. et al. ............... 364/424.02 |
| 5,109,425 | * | 4/1992 | Lawton .................................... 382/1 |
| 5,155,684 | * | 10/1992 | Burke et al. .................... 364/424.02 |
| 5,220,508 | * | 6/1993 | Ninomiya et al. .................... 364/449 |
| 5,307,419 | * | 4/1994 | Tsujino et al. .......................... 382/1 |
| 5,310,248 | * | 5/1994 | King et al. ............................ 299/1.1 |
| 5,530,330 | * | 6/1996 | Baiden et al. ....................... 318/580 |
| 5,745,869 | * | 4/1998 | van Bezooijen ..................... 701/222 |
| 5,871,260 | * | 2/1999 | Delli-Gatti, Jr. ....................... 299/19 |
| 5,999,865 | * | 12/1999 | Bloomquist et al. .................. 701/25 |

OTHER PUBLICATIONS

SME Mining Enginering Handbook, Hartman, et al. pp1910–1912; published 1992.*

* cited by examiner

Primary Examiner—David Bagnell
Assistant Examiner—John Kreck

(57) ABSTRACT

A mining machine having a position sensing and control apparatus is claimed. The mining machine has a vehicle body having forward and rearward ends and movable along a mine floor. A cutter head is mounted on the forward end of the mining machine for upward and downward movement relative to the vehicle body. A conveyor mounted on the vehicle body conveys material cut by the cutter head. The position sensing and control apparatus has at least one light source and at least one imaging device mounted on the machine. The position sensing and control apparatus captures images of natural features of an interior surface of a mine, digitizes the images and determines the distance between the imaging device and the natural feature to determine positional change of the machine.

4 Claims, 3 Drawing Sheets

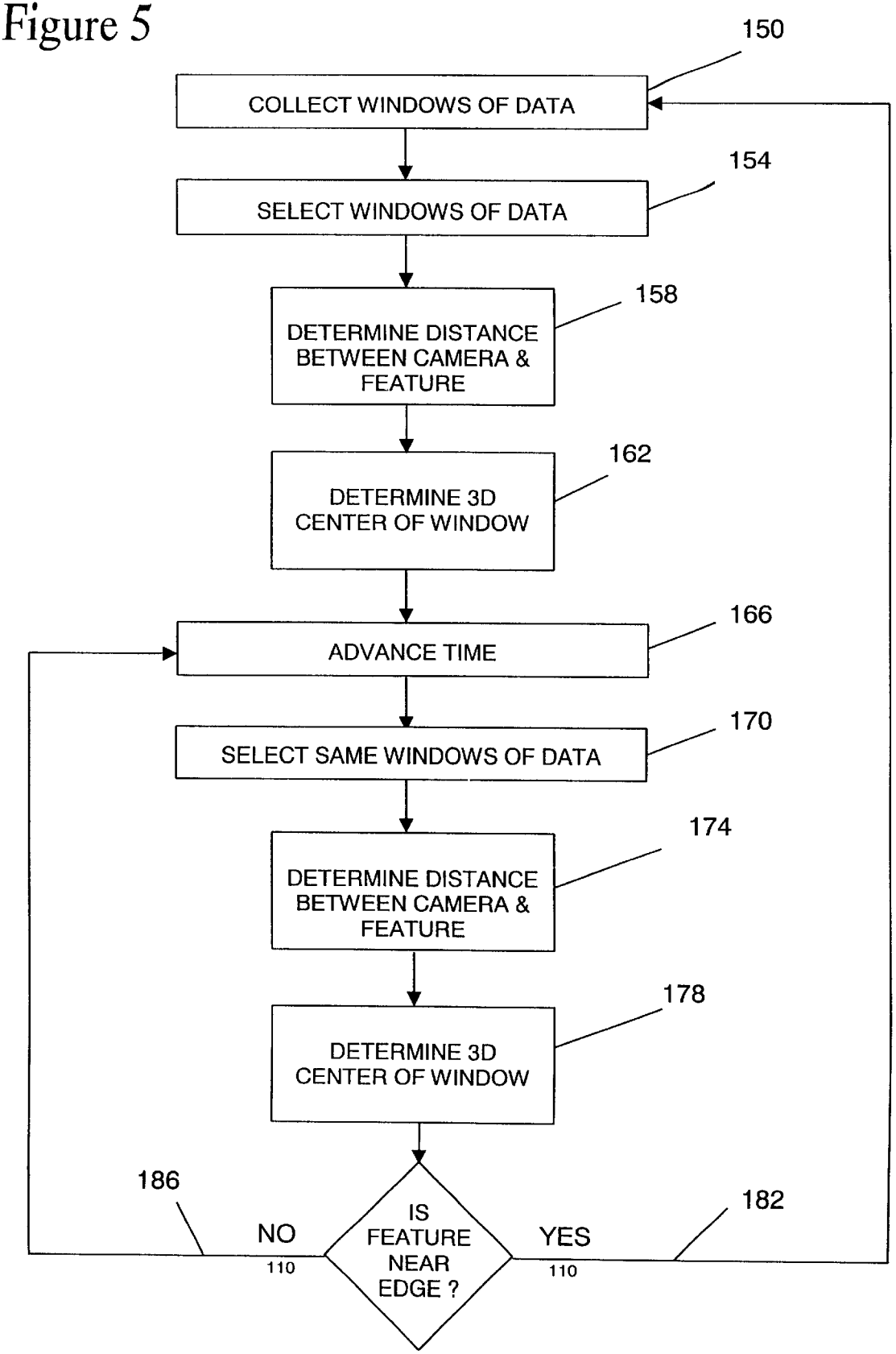

VISION-BASED MOTION SENSOR FOR MINING MACHINE CONTROL

BACKGROUND OF THE INVENTION

The invention relates to mining machines. More particularly, the invention relates to continuous mining machines, and to methods and apparatus for controlling such machines.

SUMMARY OF THE INVENTION

The invention provides a mining machine comprising a vehicle body having forward and rearward ends, a cutter head mounted on the forward end for upward and downward movement relative to the vehicle body, and a conveyor mounted on the vehicle body for conveying material cut by the cutter head toward the rearward end. The machine also comprises a position sensing and control apparatus. The apparatus includes at least one imaging module including a diffuse light source and a striping light source, and at least one camera mounted on the vehicle body. The camera has a filter so that the camera picks up only light having the wave length of the diffused light source and the light strip source. The camera captures an image of natural features of an interior surface of the mine. The apparatus also includes a computer having a framegrabber that receives successive images from the camera. The computer uses the successive images to determine at least one of the roll, pitch and yaw and translation along the x, y and z axes of the machine.

In an embodiment of the invention, the computer digitizes the image and separates the image into first and second, or even and odd data fields. The even data fields show the image illuminated by the diffused light source, and the odd data fields show the image illuminated by the striping light source. The even data field is used to determine a three dimensional center of a natural feature of an interior surface of the mine. The odd data field is used to determine the distance between the camera and the natural features of the interior surface of the mine. When successive images are captured, the computer computes the distance between the camera and the natural feature of successive images to determine three degrees of rotational change and three degrees of translational change between the successive images. The six degrees of freedom are then used to compute the position and orientation of the machine.

In one embodiment of the invention, the mining machine further comprises a controller for steering the vehicle body using a PID control and the computer transmit the position and orientation of the controller.

In another embodiment of the invention, the mining machine further comprises an operator display, and the computer transmits the position and orientation to the operator display.

In the preferred embodiment of the invention, the mining machine has multiple imaging modules at different locations on the vehicle to provide robust six degrees of freedom motion information.

It is an advantage of the invention to use a light striper to determine the three dimensional center of a natural feature.

It is another advantage of the invention to use a filter tuned to the wavelength of the light sources in order to minimize the effect of ambient light.

It is another advantage of the invention to provide a cost effective detection system operable in a harsh temperature and vibration environment.

It is another advantage of the invention to provide a detection system requiring minimal space.

Other features and advantages of the invention will become apparent to those skilled in the art upon review of the following detailed description, claims and drawings.

DESCRIPTION OF THE DRAWINGS

FIG. 5 is a flowchart illustrating operation of the position sensing and control apparatus of FIG. 4.

Figure 1:
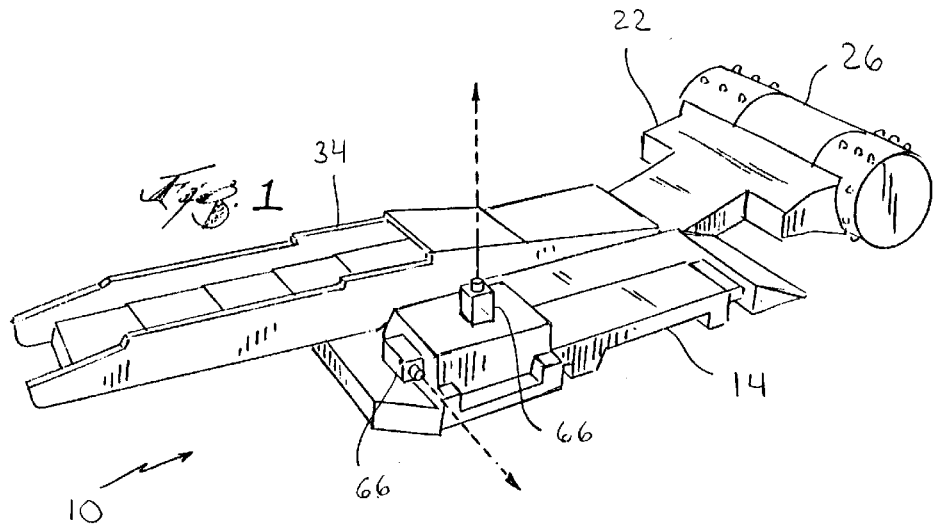
FIG. 1 is a perspective view of a continuous mining machine embodying the invention.

Before one embodiment of the invention is explained in detail, it is to be understood that the invention is not limited in its application to the details of construction and the arrangements of the components set forth in the following description or illustrated in the drawings. The invention is capable of other embodiments or being carried out in various ways. Also, it is understood that the phraseology and terminology used herein is for the purpose of description and should not be regarded as limiting. The use of "including" comprising and variations thereof herein is meant to encompass the items thereafter and equivalents thereof as well as additional items. The use of "consisting of" and variations thereof herein is meant to encompass only the items listed thereafter. The use of letters to identify steps of a method or process as simply for identification and is not meant to indicate that the steps should be performed in a particular order.

DESCRIPTION OF THE PREFERRED EMBODIMENT

A continuous mining machine 10 embodying the invention as illustrated in FIG. 1. The machine 10 comprises a vehicle body 14 having forward and rearward ends. The vehicle body 14 is supported by crawlers or treads (not shown) for movement along a mine floor (not shown). The machine 10 also comprises a boom 22 extending from the forward end of the vehicle body 14, and a cutter head 26 mounted on the boom 22 for upward and downward movement for cutting a mine face. The machine 10 also comprises a conveyor 34 mounted on the vehicle body 14 for conveying material cut by the cutter head 26 toward the rearward end of the machine 10. As thus far described as conventional, as would be understood by one skilled in the art.

Figure 2:
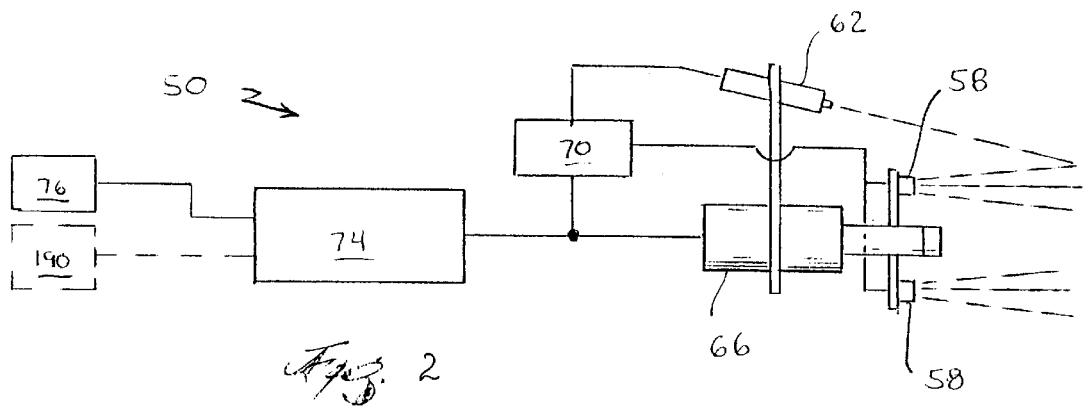
FIG. 2 is a schematic view of the position sensing and control apparatus of the machine.

The mining machine 10 also comprises a position sensing and control apparatus 50, as illustrated in FIG. 2. The apparatus 50 includes at least one imaging module 54. In a preferred embodiment, the apparatus 50 includes four imaging modules 54. Two imaging modules 54 are illustrated being on one side of the vehicle 10 in FIG. 1. The other two imaging modules 54 are similarly located on the other side of the vehicle 10. Each imaging module 10 includes a diffuse light source 58, a striping light source 62, and an imaging device (such as a camera) 66 mounted on the vehicle body 14. The camera 66 has a filter so that the camera 66 picks up only light having the wavelength of the diffuse light source 58 and the light stripe source 62, and filters out any extraneous light from within the mine. A first controller 70 operates the diffuse light source 58 and the light stripe source 62, toggling between the light sources 58 and 62 such that when one source is ON, the other source is OFF, and vice-versa. The camera 66 captures an image of natural features of the interior surface of the mine. The apparatus 50 also includes a computer 74, having a framegrabber, to process the captured images and to keep track of the various natural features captured from image to image. The computer 74 may also house the first controller 70. The apparatus further includes an operator display 76 which receives positional information from the apparatus 50.

Based on the uniqueness of the images captured by each of the cameras 66, the computer 74 selectively determines which images to process and which natural features to track. The use of multiple imaging modules 54 also provide redundancy in the system, which helps in further confirmation of the positioning of the machine 10.

Figure 3:
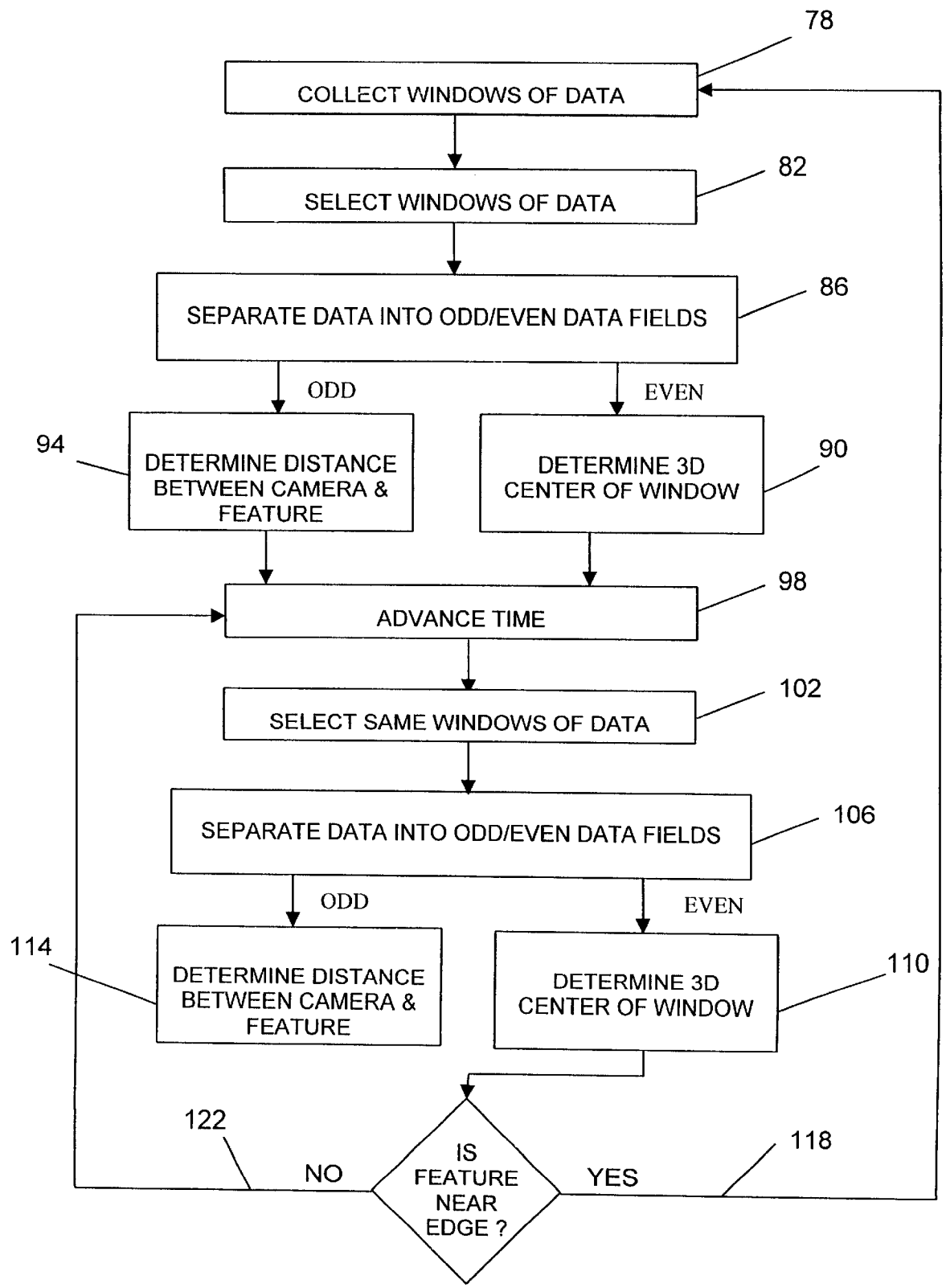
FIG. 3 is a flowchart illustrating operation of the position sensing and control apparatus 2.

FIG. 3 illustrates a flowchart of operation of the computer 74 in relation to the arrangement described in FIG. 2. The computer 74 receives a first image from each camera 66, digitizes the image and subdivides the image into windows of data (box 78). A predetermined number of windows of data are selected (box 82). Selection of windows of data are based on the clarity and on uniqueness of natural features captured in the image. In a preferred embodiment, four windows of data are selected. The computer 74 then separates the windows of data into an even data field and an odd data field (box 86). The even data field shows the image illuminated by the diffuse light source 58. The computer 74 uses the even data field to determine the three dimensional center of the natural feature (box 90). The first odd data field shows the image illuminated by the light stripe 62. The computer 74 uses the odd data field to determine the distance between the camera 66 and the natural feature (box 94). The distance between the camera 66 and the natural feature is computed by using triangulation.

At the next time interval (box 98), the computer 74 then receives a second image from each camera 66, digitizes the second image and separates the windows of data of second image (box 102) into a second even data field and a second odd data field (box 106). The time interval ranges from approximately 50 microseconds to approximately 400 microseconds. In a preferred embodiment, the time interval is about 110 microseconds. The second even data field shows the image illuminated by the diffuse light source 58, tracks the location of the natural feature and determines the three dimensional center of the natural feature (box 110). The second odd data field shows the image illuminated by the light stripe 62 and determines the distance between the camera 66 and the natural feature (box 114). If the three dimensional center of the natural feature being tracked is near an edge of the data window, new windows of data are collected (line 118). If the three dimensional center of the natural feature is not near an edge of the natural feature, the next time interval is advanced and the four windows of data are again analyzed (line 122).

Upon the computer 66 having collected time and position data, six degrees of positional change of the machine 10 are computed. The six degrees of positional change are then used to compute the roll, pitch, yaw and translational offset of the machine 10.

Figure 4:
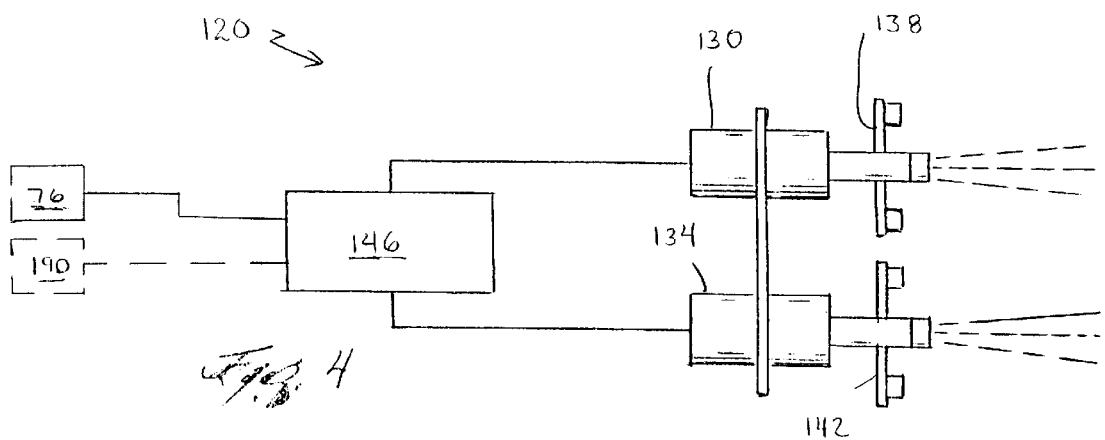
FIG. 4 is a schematic view of an alternative position sensing and control apparatus.

Multiple cameras may be mounted on the vehicle body, as shown in an alternative position sensing and control apparatus 126 in FIG. 4. This is the preferred embodiment of the invention. The apparatus 126 includes multiple imaging devices, such as cameras 130 and 134. The apparatus 126 also includes light sources 138 and 142. The light sources 138 and 142 may be any type of light source capable of illuminating natural features sufficient for the cameras 130 and 134 to capture images of the natural features, including striping light sources and a diffuse light sources. The cameras 130 and 134 have filters so that the cameras 130 and 134 pick up only light having the wavelength of the light sources 138 and 142, filtering any extraneous light from within the mine. In the same manner as described with respect to FIGS. 1 and 2, the cameras 130 and 134 capture images of natural features and keep track of the natural features of the interior surface of the mine. Cameras 130 and 134 focus on the same natural feature, and use stereo imaging to determine the relative position of the natural feature with respect to the cameras, and accordingly, the machine 10. The apparatus 126 also includes a computer 146 having a framegrabber.

FIG. 5 illustrates a flowchart of operation of the computer 146, wherein multiple cameras are used to determine distance between the cameras and the natural feature as described in FIG. 4. The computer 146 collects first and second images from cameras 130 and 134, digitizes the images and subdivides the images into windows of data (box 150). A predetermined number of windows of data are selected (box 154). Selection of windows of data is based on the clarity and uniqueness of natural features captured in the images. In a preferred embodiment, four windows of data are selected. Using more than one camera allows for the use of stereo vision to determine the distance between the camera and the feature (box 158) and to determine the three dimensional center of the window (box 162). The difference between images captured by the cameras 130 and 134, and knowledge of the distance between the cameras 130 and 134, allows three-dimensional information of the natural feature to be recorded.

At the next time interval (box 166), the computer 146 receives third and fourth images from the cameras 130 and 134, respectively. The third and fourth images are of the same natural feature as captured by the first and second images. The computer 146 digitizes the third and fourth images, and separates the third and fourth images into windows of data (box 170). Again, using stereo vision, the distance between the camera and the feature is determined (box 174) and the three dimensional center of the window is determined (box 178). If the three dimensional center of the natural feature is near an edge of the data window, new windows of data are collected (line 182). If the three dimensional center of the natural feature is not near an edge of the data window, the next time interval is advanced and the four windows of data are again analyzed (line 186).

Upon the computer 146 having collected time and position data, six degrees of positional change of the machine 10 are computed. The six degrees of positional change information is used to compute the roll, pitch, yaw and translational offset of the machine 10. The six degrees of positional change information is then communicated to the operator display 76.

In an alternative embodiment of the invention (shown in phantom in FIGS. 2 and 4), the mining machine 10 comprises a second controller 190 for steering the vehicle body 14 using a PID control, and the computer transmits the roll, pitch, yaw and translation to the second controller 190.

Various features in the invention are set forth in the following claims.

What is claimed is:

1. A mining machine comprising:

a vehicle body having forward and rearward ends, said vehicle body being movable along a mine floor;

a cutter head mounted on said forward end for upward and downward movement relative to said vehicle body;

a conveyer mounted on said vehicle body for conveying material cut by said cutter head toward said rearward end; and a position sensing and control apparatus including
- at least one imaging module including
  - a diffuse light source and a striping light source; and
  - at least one imaging device mounted on said vehicle body, said imaging device having a filter so that said imaging device picks up only light having the wavelength of said diffuse light source and said light stripe source, and said imaging device capturing an image of natural features of an interior surface of the mine; and
- a computer having a framegrabber, said computer receiving a first image and a second image from said imaging device, said computer digitizing the first image and separating said first image into an even data field and digitizing said second image and separating said second image into an odd data field, said even data field showing the image illuminated by the diffuse light source, said computer using the even data field to determine the center of the natural feature, said first odd data field showing the image illuminated by the light stripe, said computer using the odd data field to determine the distance between the imaging device and the natural feature, said computer receiving a third image and a fourth image from said imaging device, said computer digitizing said third image and separating said third image into a second even data field and said computer digitizing said fourth image and separating said fourth image into a second odd data field, said second even data field showing the image illuminated by the diffuse light source and tracking the location of the natural feature and determining the center of the natural feature, said second odd data field showing the image illuminated by the light stripe and determining the distance between the imaging device and the natural feature, said computer computing the distance between the imaging device of successive images and the natural feature to determine six degrees of positional changes between said successive images, said six degrees of positional changes used to compute the roll, yaw and lateral offset of said machine.

2. A mining machine as set forth in claim 1 and further comprising a controller for steering said vehicle body using PID control, and wherein said computer transmits said roll, yaw and lateral offset to said controller.

3. A mining machine as set forth in claim 1 and further comprising an operator display, and wherein said computer transmits said roll, yaw and lateral offset to said operator display.

4. A mining machine as set forth in claim 1, wherein said machine comprises four imaging modules.

* * * * *